(12) United States Patent
Isono et al.

(10) Patent No.: US 9,322,344 B2
(45) Date of Patent: Apr. 26, 2016

(54) ENGINE-POWERED WORK TOOL PROVIDED WITH WIND GOVERNOR

(71) Applicant: HITACHI KOKI CO., LTD., Tokyo (JP)

(72) Inventors: Toshiaki Isono, Chiba-ken (JP); Genju Akiba, Chiba-ken (JP)

(73) Assignee: Hitachi Koki Co., Ltd., Tokyo (JP)

( * ) Notice: Subject to any disclaimer, the term of this patent is extended or adjusted under 35 U.S.C. 154(b) by 70 days.

(21) Appl. No.: 14/459,027

(22) Filed: Aug. 13, 2014

(65) Prior Publication Data

US 2015/0047604 A1    Feb. 19, 2015

(30) Foreign Application Priority Data

Aug. 19, 2013  (JP) ................. 2013-169841

(51) Int. Cl.
| | |
|---|---|
| *F02D 7/00* | (2006.01) |
| *F02D 31/00* | (2006.01) |
| *A01D 34/90* | (2006.01) |
| *F02M 35/10* | (2006.01) |
| *F02D 9/10* | (2006.01) |
| *F02B 63/02* | (2006.01) |
| *F01P 1/02* | (2006.01) |

(52) U.S. Cl.
CPC ................ *F02D 31/00* (2013.01); *A01D 34/90* (2013.01); *F01P 1/02* (2013.01); *F02B 63/02* (2013.01); *F02D 9/1065* (2013.01); *F02M 35/1017* (2013.01); *F02M 35/10196* (2013.01)

(58) Field of Classification Search
CPC ............ F02D 31/00; F02D 2009/0208; F02D 2009/0216; F02D 9/1065; F02D 2009/0264; F02D 2009/0267; F02D 2400/06; F02D 2009/0218; F02D 11/02; F02D 11/06; F02D 1/04; F02D 2009/021; F02D 2200/101; F02D 2700/0238

USPC ......... 123/376, 363, 365, 366, 377, 389, 398, 123/400, 403, 437, 41.58, 41.68, 41.11, 123/41.56, 41.63, 41.65
See application file for complete search history.

(56) References Cited

U.S. PATENT DOCUMENTS

| | | | | |
|---|---|---|---|---|
| 3,650,252 | A | * | 3/1972 | Glover et al. ................ 123/392 |
| 4,961,409 | A | * | 10/1990 | Kobayashi et al. ........... 123/376 |
| 5,726,503 | A | * | 3/1998 | Domanski et al. .......... 290/40 B |
| 6,962,138 | B2 | * | 11/2005 | Garrick et al. ................ 123/337 |

(Continued)

FOREIGN PATENT DOCUMENTS

JP    6-123243  A    5/1994

*Primary Examiner* — Lindsay Low
*Assistant Examiner* — Long T Tran
(74) *Attorney, Agent, or Firm* — Kilpatrick Townsend & Stockton LLP

(57) ABSTRACT

An engine-powered work tool includes an engine having a crank shaft, an output controller and a wind governor. The output controller includes an output control shaft angularly rotatable about its axis for controlling a rotation speed of the crank shaft. The wind governor can control the angular rotation of the output control shaft and includes: a governor plate for receiving cooling air generated at a cooling fan connected to the crank shaft; an arm fixed to the output control shaft; and a governor spring connected to the arm for biasing the output control shaft to increase the rotation speed of the crank shaft. The governor plate functions to bias the output control shaft to decrease the rotation speed of the crank shaft upon receipt of the cooling air. The governor spring has an end changeable in position relative to the output controller among a plurality of prescribed positions.

10 Claims, 11 Drawing Sheets

(56) References Cited

U.S. PATENT DOCUMENTS

| | | | |
|---|---|---|---|
| 7,118,097 B2* | 10/2006 | Moriyama et al. | 261/39.4 |
| 7,343,898 B1* | 3/2008 | Caldwell et al. | 123/376 |
| 7,353,802 B1* | 4/2008 | Iwata et al. | 123/376 |
| 7,950,366 B2* | 5/2011 | Arai et al. | 123/376 |
| 2011/0005024 A1* | 1/2011 | Spitler et al. | 15/320 |
| 2011/0226217 A1* | 9/2011 | Raasch | 123/376 |
| 2011/0232928 A1* | 9/2011 | Raasch | 173/140 |
| 2012/0304963 A1* | 12/2012 | Raasch | 123/376 |
| 2013/0276751 A1* | 10/2013 | Raasch | 123/352 |

* cited by examiner

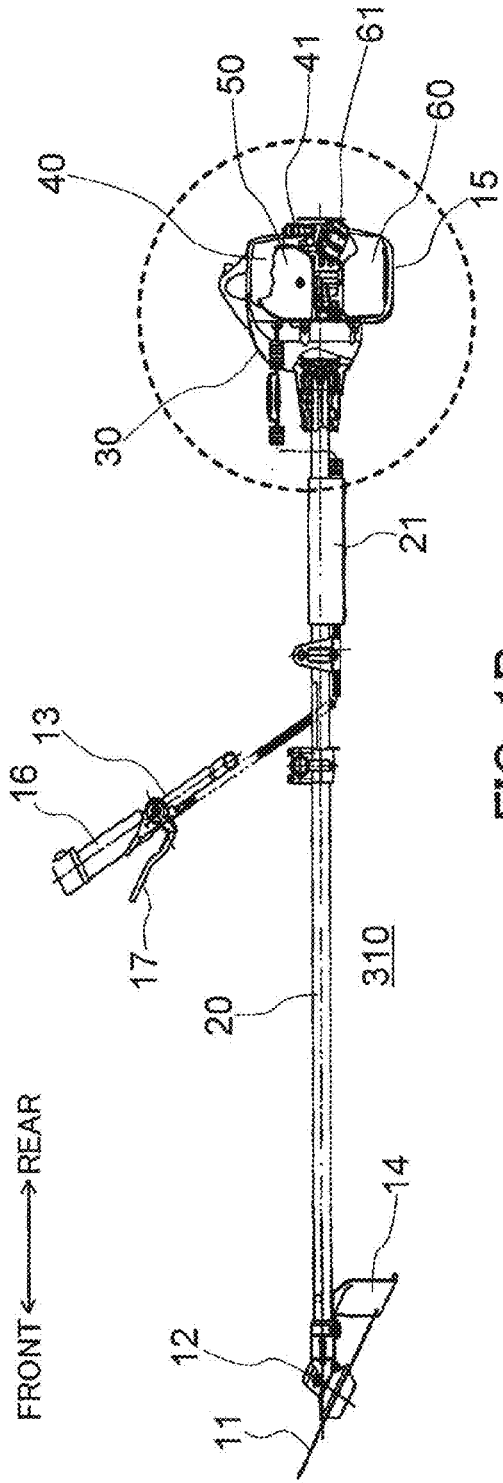
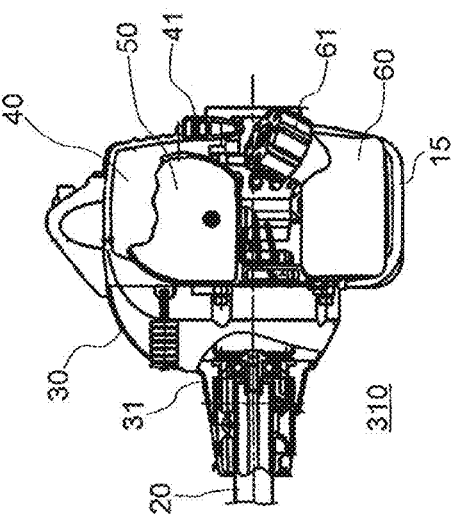

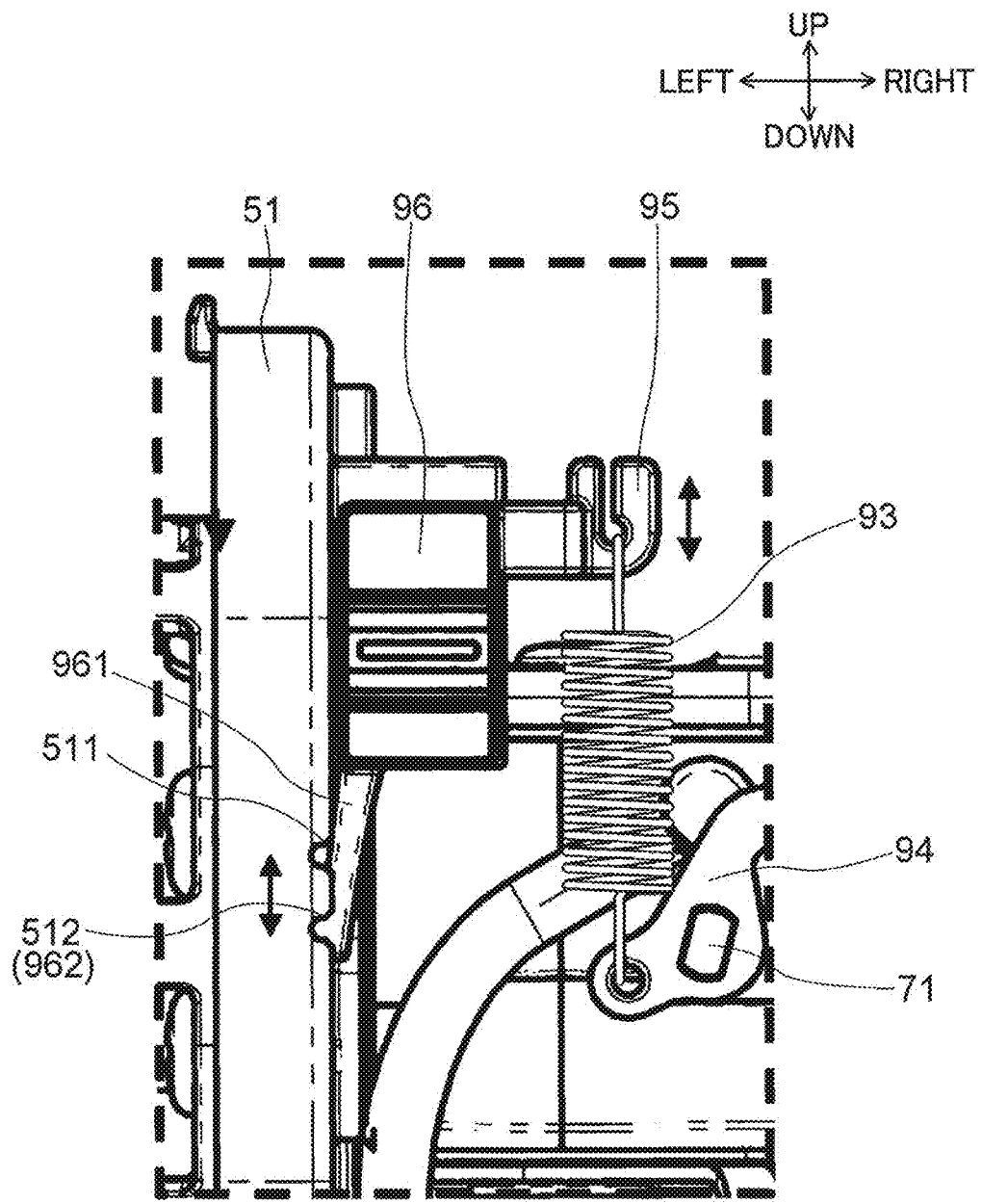

ENGINE-POWERED WORK TOOL PROVIDED WITH WIND GOVERNOR

CROSS REFERENCE TO RELATED APPLICATION

This application claims priority from Japanese Patent Application No. 2013-169841 filed Aug. 19, 2013, the entire content of which is incorporated herein by reference.

TECHNICAL FIELD

The present invention relates to a work tool provided with a compact engine, such as a brush cutter.

BACKGROUND

A compact engine is employed as a power source in an electric generator and a portable work tool such as a grass-trimmer, a brush cutter, a blower, a chain-saw, and a power cutter.

Such a conventional engine includes a cooling fan provided on one end of a crank shaft for cooling a cylinder. Rotation of the crank shaft causes the cooling fan to rotate, thereby generating cooling air for cooling the cylinder.

Japanese Patent Application. Publication No. H06-123243 discloses a mechanism in which a wind governor is employed to utilize cooling air for controlling operational states (rotation speed) of an engine. Specifically, a governor plate is disposed on an air flow path of the cooling air within a fan case. The governor plate is connected to a throttle valve shaft of a carburetor and is pivotally movable about this throttle valve shaft.

In this mechanism, when the rotation speed of the engine decreases to reduce the strength of the cooling air, the throttle valve shaft is biased in a direction to increase a throttle opening. On the other hand, when the rotation speed of the engine increases to increase the strength of the cooling air, the governor plate causes the throttle valve shaft to pivotally move toward a direction to reduce the throttle opening. With this structure, the rotation speed of the engine is controlled to be substantially constant.

This mechanism is easily configured by simply connecting a small-sized governor plate (wind governor) to the throttle valve shaft and is therefore effective in various types of portable engine-powered work tools that require compact engines.

SUMMARY

The rotation speed of the engine is automatically controlled to be substantially constant in the above-described mechanism. However, conceivably, there may be cases where required operations may not be performed sufficiently at the designated rotation speed of the engine depending on purposes of the work tool provided with this engine. Therefore preferably, the rotation speed of the engine can be reset (adjusted) during the operations.

In order to allow the rotation speed of an engine in a working state to be changed during operations, a complicated structure is required especially in the vicinity of a carburetor. As an alternative, the rotation speed may be controlled electrically, but such an electrical control also requires a complicated configuration. Preferably, provision of such complicated structure should be avoided in an engine-powered work tool such as the brush cutter in view of a demand for compact and lightweight work tool.

Thus it is difficult to change the rotation speed of the engine easily during operations in the lightweight engine-powered work tool.

In view of the foregoing, it is an object of the present invention to provide a work tool provided with a compact engine capable of overcoming the above-described problems.

In order to attain the above and other objects, the invention provides an engine-powered work tool including an air-cooled engine, an output controller and a wind governor. The air-cooled engine includes a crank shaft configured to rotate, and a cooling fan fixed to the crank shaft and configured to rotate together with the crank shaft to generate cooling air. The output controller is configured to control a rotation speed of the crank shaft and includes an output control shaft defining an axis and configured to make an angular rotation about the axis, the rotation speed of the crank shaft being controlled based on the angular rotation of the output control shaft. The wind governor is configured to control the angular rotation of the output control shaft. The wind governor includes a governor plate, an arm and a governor spring. The governor plate is configured to receive the cooling air to apply a force to the output control shaft such that the rotation speed of the crank shaft decreases. The arm is fixed to the output control shaft. The governor spring is configured to apply a biasing force to the output control shaft through the arm such that the rotation speed of the crank shaft increases, the governor spring having one end connected to the arm and another end changeable in position relative to the output controller among a plurality of prescribed positions, the position of the another end of the governor spring being switchable from one to another among the plurality of prescribed positions.

Preferably, the output controller includes a main body through which the output control shaft penetrates, the output control shaft having one end and another end opposite to each other; and the governor plate is fixed to the one end of the output control shaft and the governor spring is fixed to the another end of the output control shaft.

Preferably, the engine-powered work tool further includes an air cleaner configured to introduce air into the output controller, an air cleaner box attached to the output controller for covering the air cleaner, and a mounting portion selectively attachable to the air clear box at one of a plurality of mounting positions corresponding to the plurality of prescribed positions, the another end of the governor spring is engaged with the mounting portion such that the position of the another end of the governor spring relative to the air cleaner box can be changed from one to another among the plurality of prescribed positions.

Preferably, the engine-powered work tool further includes a handle to be gripped by an operator, and a throttle wire having one end provided with an abutting portion configured to abut on the arm and another end connected to the handle. The abutment of the abutting portion with the arm causes the output control shaft to be biased in a direction to decrease the rotation speed of the crank shaft.

Preferably, the handle is provided with a throttle lever connected to the another end of the throttle wire, the operator's operation of the throttle lever at the handle enabling the abutting portion to abut on and separate from the arm.

Preferably, the engine-powered work tool further includes a handle to be gripped by an operator, and an adjustment wire having one end connected to the another end of the governor spring and another end provided at the handle, the position of the another end of the governor spring relative to the output controller being switchable from one to another among the plurality of prescribed positions in accordance with operations by the operator at the handle through the adjustment wire.

Preferably, the handle is provided with a switching dial connected to the another end of the adjustment wire, the operator's operations of the switching dial at the handle enabling the position of the another end of the governor spring to be switched from one to another among the plurality of prescribed positions.

Preferably, the engine-powered work tool further includes a throttle wire having one end provided with an abutting portion configured to abut on the arm and another end connected to the handle, the abutment of the abutting portion with the arm causing the output control shaft to be biased in a direction to decrease the rotation speed of the crank shaft.

Preferably, the handle is provided with a throttle lever connected to the another end of the throttle wire, the operator's operation of the throttle lever at the handle enabling the abutting portion to abut on and separate from the arm.

Preferably, the engine-powered work tool further includes a cutting blade configured to rotate in accordance with the rotation of the crank shaft, and a supporting shaft having one end provided with the cutting blade and another end provided with the air-cooled engine, the output controller and the wind governor to constitute a brush cutter.

BRIEF DESCRIPTION OF THE DRAWINGS

In the drawings:

FIG. 1A is a side view showing a general construction of a brush cutter according to an embodiment of the present invention;

FIG. 1B is an enlarged cross-sectional view of a rear end portion of the brush cutter of the embodiment enclosed by a broken line in FIG. 1A;

FIG. 6 is an enlarged view illustrating a structure in the vicinity of a governor spring mounting portion of the brush cutter according to the embodiment;

DETAILED DESCRIPTION

Figure 2:
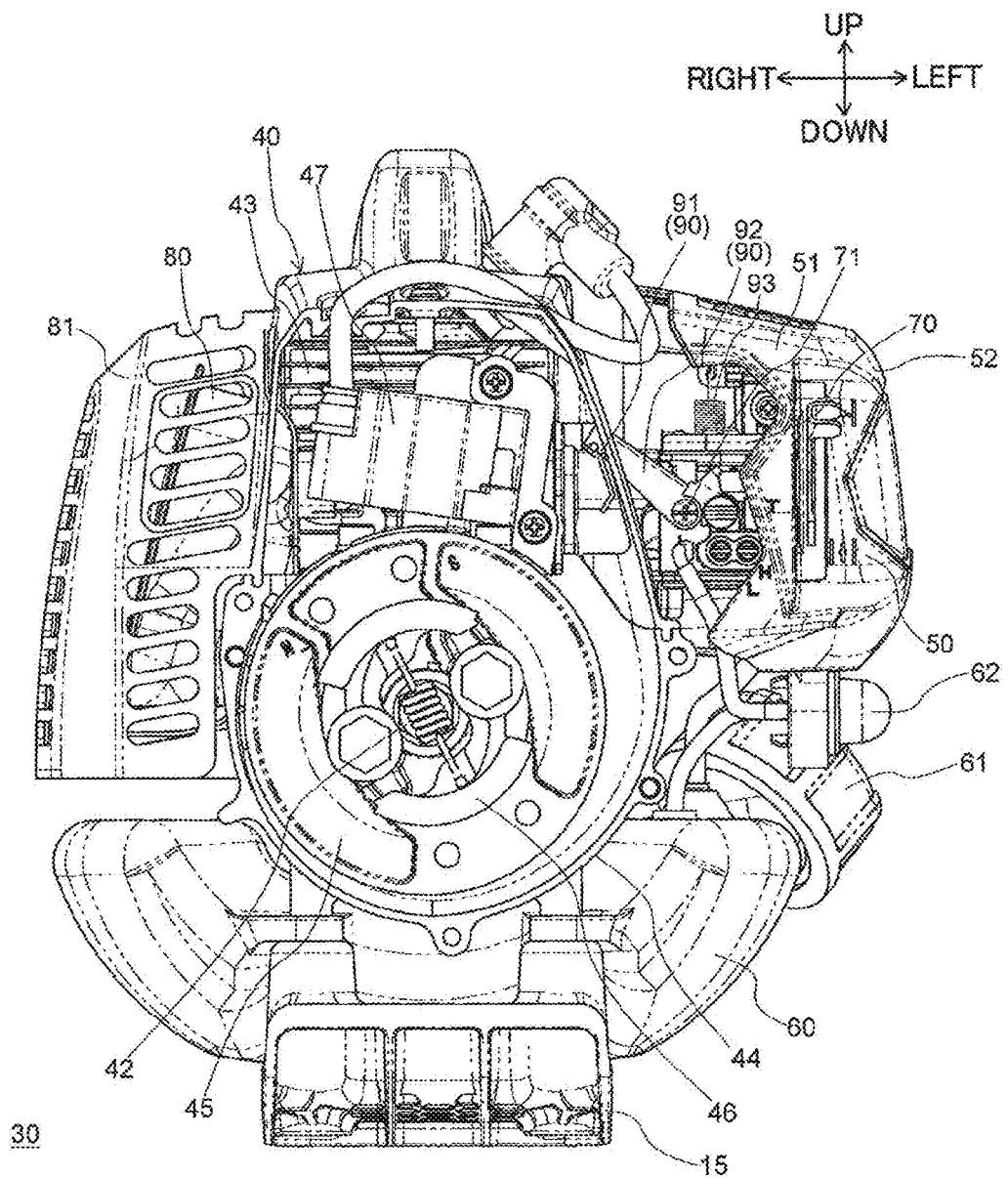
FIG. 2 is a front view of a drive section, without a fan case, of the brush cutter according to the embodiment, the drive section including an engine and a wind governor.

A brush cutter 310 as an example of an engine-powered work tool according to an embodiment of the present invention will be described with reference to FIGS. 1A through 8.

Descriptions used in the following description in relation to the brush cutter 310 will reference the state of brush cutter 310 shown in FIG. 1A assuming that the brush cutter 310 is placed on the ground. Specifically, hereinafter, left and right sides of the brush cutter 310 shown in FIG. 1A will be referred to as the "front side" and "rear side" respectively and an up-down direction in FIG. 1A will be referred to as the up-down direction.

Referring to FIGS. 1A and 1B, the brush cutter 310 includes a shaft 20 extending in a front-rear direction (as an example of a supporting shaft), a cutting blade 11 and a drive section 30 accommodating an engine 40 (as an example of an air-cooled engine). The cutting blade 11 is rotatably provided on a front end portion (one end) of the shaft 20. The drive section 30 is disposed at a rear end portion (another end) of the shaft 20 for driving (rotating) the cutting blade 11. The engine 40 is used as a power source of the drive section 30. A drive shaft (not shown) is coaxially disposed within the shaft 20 and is connected to a crankshaft 42 (see FIG. 2) of the engine 40 through a centrifugal clutch 46 (see FIG. 2). When a rotation speed of the crankshaft 42 increases and the centrifugal clutch 46 is connected to the drive shaft, the drive shaft (not shown) starts to rotate upon receipt of the drive power from the engine 40. This rotation of the drive shaft is transmitted to a gear case 12 provided at the front end portion of the shaft 20 to rotate the cutting blade 11 at an appropriate speed reduction ratio.

Handles 13 for gripping by an operator are provided at respective left and right sides near a center of the shaft 20 in the front-rear direction. In FIG. 1A, only one of the handles 13 (right handle 13) is shown. A grip 16 is provided at a distal end portion of each of the handles 13. The grip 16 is formed in a shape that facilitates the operator's gripping. Further, a waist pad portion 21 is provided on the shaft 20 between the handles 13 and drive section 30 for facilitating operator's operations while holding the handles 13. Specifically, the waist pad portion 21 is formed by an elastic material provided on the shaft 20 to cover (surround) the same such that the waist pad portion 21 has an outer diameter larger than that of the shaft 20. The operator performs cutting work while gripping the handles 13 (grips 16) with his or her waist supported by the waist pad portion 21. Still further, an antiscattering cover 14 is provided below the cutting blade 11 for preventing cut grass and branches from being scattered toward the operator.

The drive section 30 includes the engine 40, a fuel tank 60, a protective cover 15, a carburetor 70, an air cleaner 50, a muffler 80 and a wind governor 90. The fuel tank 60 is fixedly provided below the engine 40 for storing fuel. Before using the brush cutter 310, the operator should remove a tank cap 61 (see FIGS. 1B and 2) for supplying fuel into the fuel tank 60. In general, a fuel tank and its tank cap are provided below the engine in order to prevent supplied fuel from adhering to an ignition plug provided at the engine or wirings connected to the ignition plug. The fuel tank 60 is thus positioned at a lower rear end portion of the brush cutter 310.

As illustrated in FIGS. 1A and 1B, the protective cover (stand) 15 is provided to cover a lower portion of the fuel tank 60. The protective cover 15 is made of a resin material and is designed to support the brush cutter 310 when the brush cutter 310 is placed on the ground.

Referring to FIG. 2, the engine 40 is a compact two-cycle air-cooled engine and includes a cylinder 43, the crankshaft 42 and a cooling fan (not shown). The cylinder 43 is provided in an upper portion of the engine 40. The cylinder 43 mainly includes therein a combustion chamber and the piston (not shown), and has an outer peripheral surface in which a large number of cooling fins are formed. A suction port (not shown)

is provided to the left of the cylinder 43 and an exhaust port (not shown) is provided to the right of the cylinder 43.

The carburetor 70 (as an example of an output controller) is attached to the suction port provided on the left side of the cylinder 43. The carburetor 70 is configured to generate air-fuel mixture and supply the same to the engine 40. Thus, the carburetor 70 can serve to control the rotation speed of the crank shaft 42 (the engine 40). The air cleaner 50 is attached to a left end portion of the carburetor 70. More specifically, the air cleaner 50 is covered with an air cleaner cover 52 and is attached to an air cleaner box 51 fixed to the carburetor 70. With this structure, air is introduced into the carburetor 70 through the air cleaner 50.

The muffler 80 is attached to the exhaust port provided to the right of the cylinder 43. Through the muffler 80, air from the engine 40 (cylinder 43) is exhausted. The muffler 80 tends to be hot in temperature when used and is therefore covered by a muffler cover 81.

In the engine 40, a crank case 44 is provided below the cylinder 43. The crank case 44 includes the crankshaft 42 therein. The crankshaft 42 is configured to rotate in association with a vertical reciprocating movement of a piston within the cylinder 43. The crankshaft 42 extends in the front-rear direction (in a direction perpendicular to the sheet of FIG. 2). The crankshaft 42 has a front end portion to which a magnet rotor 45 and the centrifugal clutch 46 are attached. The magnet rotor 45 is integrally provided with the cooling fan (not shown) for generating cooling air for cooling the cylinder 43. The generated cooling air is configured to flow through a fan case 31 covering the cooling fan (see FIG. 1B) and form an air flow path for cooling the cylinder 43 which becomes particularly hot among other components in the engine 40. On the other hand, a starter (recoil starter) 41 is attached to a rear end portion of the crankshaft 42 to forcibly rotate the crankshaft 42 for staring the engine 40 (see FIGS. 1A and 1B). With this structure, current flows through a generator coil (not illustrated) as the magnet rotor 45 rotates, and the current flows into an ignition coil 47 to be accumulated therein up to a level high enough to ignite the ignition coil 47.

Figure 4:
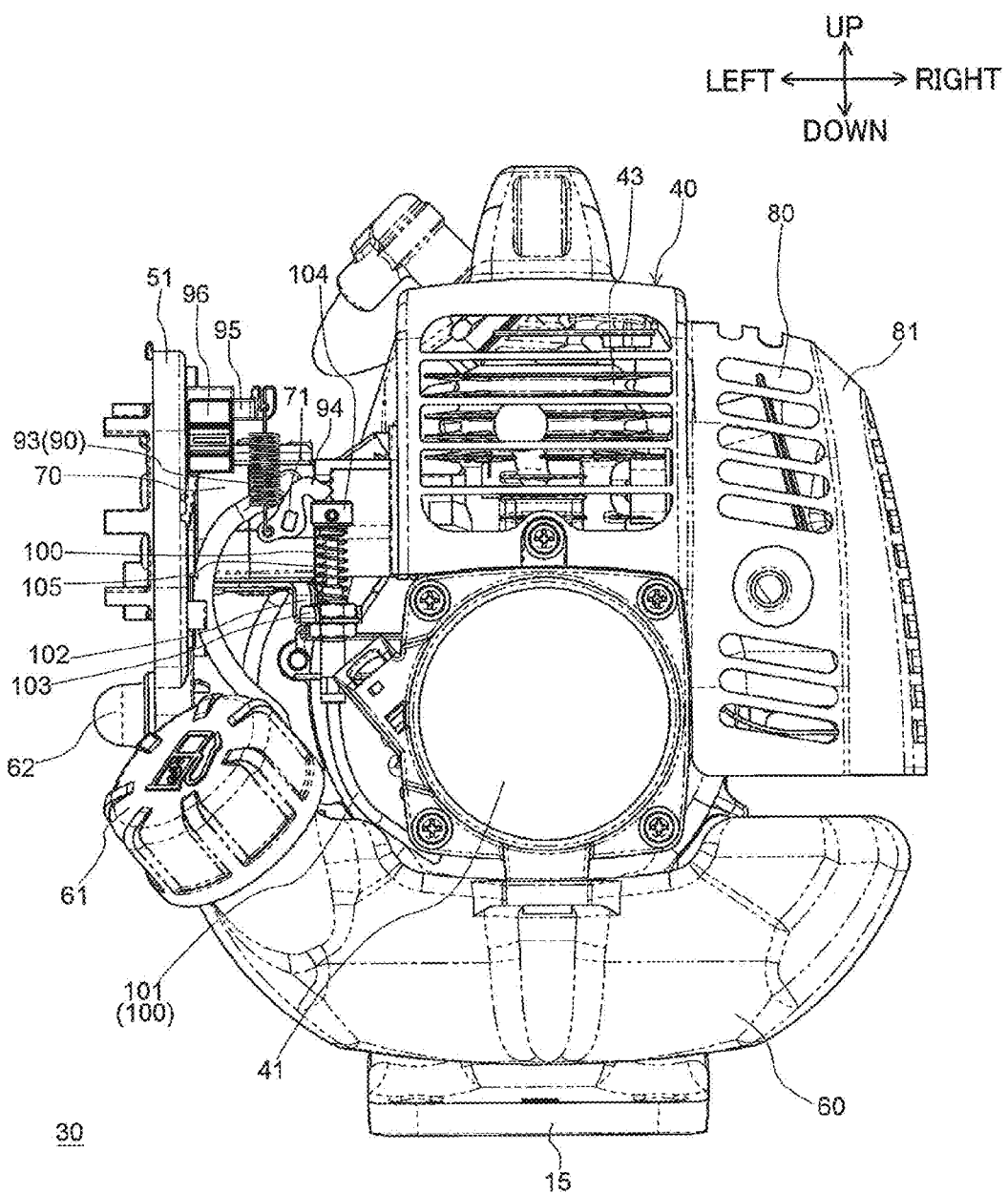
FIG. 4 is a rear view of the drive section of the brush cutter according to the embodiment.

Once the engine 40 has started, the fuel is introduced (sucked) from the fuel tank 60 up to the carburetor 70 by a negative pressure generated at the time of air intake. However, before the engine 40 is started, the fuel needs to be manually taken up to the carburetor 70. To this end, a priming pump 62 is provided as shown in FIGS. 2 and 4. As the operator operates the priming pump 62, the fuel is pumped up from the fuel tank 60 to the carburetor 70 before the engine 40 is started.

While the fuel (mixed gasoline) is supplied from the fuel tank 60 to the carburetor 70, air is also introduced into the carburetor 70 through the air cleaner 50. An air-fuel mixture is generated in the carburetor 70 and is supplied to the engine 40.

A combination of an engine and a carburetor having similar configurations as the engine 40 and carburetor 70 can be used not only for an engine-powered work tool such as the brush cutter 310 of the present embodiment, but also be applicable to other machines, such as a motorbike. However, in case of a motorbike, an angle formed between its carburetor and the ground (horizontal plane) does not vary significantly while the motorbike is in operation (during driving). However, in case of the brush cutter 310, an angle formed between the shaft 20 and the ground (horizontal plane) is often likely to change while the brush cutter 310 is being used. For example, the operator may hold the shaft 20 horizontally generally parallel to the ground, or may turn the shaft 20 into an orientation significantly inclined relative to the horizontal plane in order to adjust a cutting angle.

Although there are various types of carburetors, a diaphragm-type carburetor is effective in realizing stable supply of fuel and generation of air-fuel mixture even when the angle between the carburetor and the horizontal plane varies significantly. In the diaphragm-type carburetor, a fuel chamber formed within the carburetor is partitioned by a diaphragm formed of an elastic body, and fuel is sucked up into this fuel chamber and stored therein by a certain amount. This configuration allows stable supply of the air-fuel mixture irrespective of the angle of the carburetor relative to the horizontal plane. For this reason, the diaphragm-type carburetor is preferable as the carburetor 70 of the present embodiment.

The carburetor 70 is a so-called butterfly-type carburetor and includes a throttle valve shaft 71 (as an example of an output control shaft) and a butterfly valve (not shown). The throttle valve shaft 71 is configured to angularly rotate about its axis extending in the front-rear direction in response to operations of the wind governor 90, as will be described later. The butterfly valve is configured to pivotally move within and relative to the throttle valve shaft 71 in accordance with the angular rotation of the throttle valve shaft 71. By how much the throttle valve shaft 71 makes angular rotation and by how much the butterfly valve pivotally moves relative to the throttle valve shaft 71 in response to the angular rotation of the throttle valve shaft 71 determines a throttle opening of the throttle valve shaft 71 (or the carburetor 70). In the carburetor 70 with this structure, the throttle opening can be adjusted in accordance with the angular rotation of the throttle valve shaft 71. Generally speaking, such butterfly-type carburetor is preferable as a carburetor for an engine-powered work tool. In other words, a diaphragm-type carburetor provided with a throttle opening adjusting mechanism using a butterfly valve is particularly preferable to be used in an engine-powered work tool, just as the carburetor 70 of the present embodiment.

The rotation speed of the cutting blade 11 (engine 40) during cutting work can be thus adjusted by the angular rotation of throttle valve shaft 71. However, indeed, actual rotation speed of the cutting blade 11 may vary depending on how much load is applied to the cutting blade 11. If the rotation speed of the cutting blade 11 significantly changes during cutting work, the cutting work is difficult to be carried out. Further, if the rotation speed of the engine 40 drops significantly, the cooling air also becomes weaker in strength, possibly resulting in degradation in cooling efficiency in the engine 40. Therefore, unlike a motorbike, the brush cutter 310 is preferably controlled to keep the rotation speed of the engine 40 substantially constant during the cutting work.

Thus, operation modes of the engine 40 can be roughly divided into two: an idling state and a working state. In the idling state, the rotation speed of the engine 40 is maintained low and the centrifugal clutch 46 is not connected to the drive shaft to prevent the cutting blade 11 from rotating. In the working state, the rotation speed of the engine 40 is maintained substantially constant but higher than that in the idling state, and the centrifugal clutch 46 is connected to the drive shaft to permit the cutting blade 11 to rotate.

In order to realize switching between the idling state and working state, the operator pulls (grips) a throttle lever 17 (shown in FIG. 1A) provided near the right grip 16 while holding the both grips 16. The throttle lever 17 is connected to a throttle wire 100 (FIG. 4) that is connected to the carburetor 70. When the operator grasps the throttle lever 17 to pull the throttle wire 100 toward the handles 13, the carburetor 70 is brought into its working state.

The wind governor 90 is provided on a front end portion of the throttle valve shaft 71 of the carburetor 70 for controlling the angular rotation of the throttle valve shaft 71, utilizing the cooling air generated by the cooling fan. Thus, the wind governor 90 can serve to control the rotation speed of the engine 40 in the working state. The wind governor 90 is arranged to be on the air flow path of the cooling air so as to receive the cooling air within the fan case 31. The wind governor 90 is thus subject to the strength of the cooling air applied thereto.

The wind governor 90 includes a governor plate 91, a governor rod 92, a governor spring 93 and an arm 94.

Figure 3:
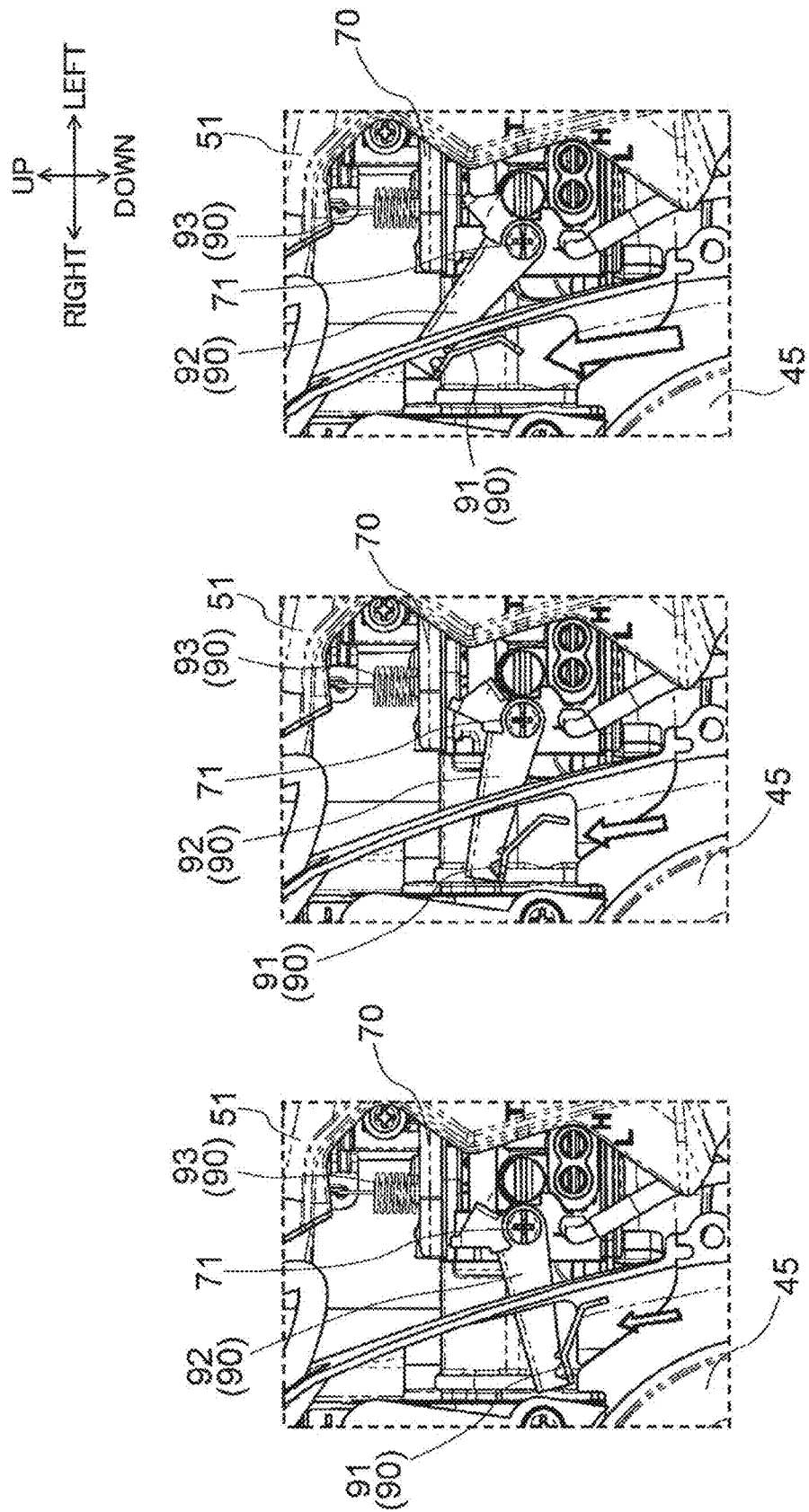
FIGS. 3A-3C are views explaining operations of the wind governor according to the embodiment as viewed from the front side thereof.

The governor plate 91 is configured to receive the cooling air. As shown in FIGS. 2 to 3C, the governor plate 91 is provided on a distal end of the governor rod 92. The governor rod 92 has a generally rectangular shape elongated in the left-right direction in a front view. The governor rod 92 has a base end connected to the front end portion of the throttle valve shaft 71. The governor plate 91 is thus mechanically linked to the throttle valve shaft 71 via the governor rod 92. Upon receipt of the cooling air at the governor plate 91, the governor rod 92 is configured to apply a force to the throttle valve shaft 71 to cause the throttle valve shaft 71 to angularly rotate.

FIGS. 3A to 3C are views illustrating operations of the wind governor 90. FIG. 3A illustrates a state where the rotation speed of the engine 40 is low (strength of the cooling air is low), FIG. 3C illustrates a state where the rotation speed of the engine 40 is high (strength of the cooling air is high), and FIG. 3B illustrates an intermediate state between FIGS. 3A and 3C. Here, the throttle opening is configured to increase (the rotation speed is caused to increase) as the throttle valve shaft 71 makes an angular rotation in a counterclockwise direction in FIGS. 3A-3C. When the cooling air applied to the governor plate 91 increases (a larger pressure is applied to the governor plate 91 from the cooling air), the throttle valve shaft 71 is caused to angularly rotate in a direction to reduce the throttle opening (i.e., clockwise direction in FIGS. 3A-3C).

As shown in FIG. 4, the arm 94 is fixed to a rear end portion of the throttle valve shaft 71. It should be noted that in FIG. 4, the air cleaner 50 and air cleaner cover 52 are removed for facilitating explanations. The arm 94 has a left end portion engaged with a lower end of the governor spring 93. The governor spring 93 has an upper end engaged with a governor spring mounting portion 95 (described later) provided on the air cleaner box 51 fixed to the carburetor 70. The governor spring mounting portion 95 is positioned upward relative to the arm 94. With this structure, the arm 94 (left end portion) is normally pulled (biased) upward by a biasing force of the governor spring 93. The governor spring 93 is configured to bias the throttle valve shaft 71 in a direction to increase the throttle opening (to increase the rotation speed of the engine 40), i.e., clockwise in FIG. 4.

When the rotation speed of the engine 40 decreases to reduce the strength of the cooling air as shown in FIG. 3A, the governor spring 93 causes the throttle valve shaft 71 to angularly rotate in a direction to increase the throttle opening, i.e., clockwise in FIG. 4. On the other hand, when the rotation speed of the engine 40 increases to increase the strength of the cooling air as shown in FIG. 3C, the governor spring 93 causes the throttle valve shaft 71 to angularly rotate in a direction to reduce the throttle opening, i.e., counterclockwise in FIG. 4. This structure functions to maintain the rotation speed of the engine 40 (crankshaft 42) substantially constant.

In this way, in the wind governor 90 of the present embodiment, the throttle valve shaft 71 is applied with forces (torque) acting in two opposite directions from the governor plate 91 and from the governor spring 93. Hence, in actual operations, the throttle opening of the throttle valve shaft 71 is determined as an equilibrium point between the pressure from the cooling air received at the governor plate 91 and the biasing force of the governor spring 93 applied to the arm 94. The rotation speed of the engine 40 in the working state is set in accordance with the throttle opening of the throttle valve shaft 71, i.e., based on by how much the throttle valve shaft 71 angularly rotates.

Here, if the biasing force of the governor spring 93 is made larger and the force acting on the throttle valve shaft 71 to bias the same in the counterclockwise direction in FIGS. 3A to 3C is caused to increase, the rotation speed of the engine 40 is set higher. On the other hand, if the biasing force of the governor spring 93 is made smaller and the force acting on the throttle valve shaft 71 to bias the same in the counterclockwise direction in FIGS. 3A to 3C is caused to become smaller, the rotation speed of the engine 40 is set lower. This means that the rotation speed of the engine 40 in the working state can be adjusted, without changing other settings, by simply adjusting (changing) the biasing force of the governor spring 93 in the working state.

Practically, however, it is difficult to replace the governor spring 93 when the brush cutter 310 is in its working state for the purpose of changing the biasing force applied to the throttle valve shaft 71. Hence, in the present embodiment, the biasing force of the governor spring 93 can be substantively changed by changing the position of the upper end of the governor spring 93, i.e., by changing the position of the governor spring mounting portion 95 engaged with the upper end of the governor spring 93. More specifically, as will be described later in detail, the biasing force of the governor spring 93 can be increased when the upper end of the governor spring 93 is moved away from the lower end of the governor spring 93, while the biasing force of the governor spring 93 is reduced by when the upper end of the governor spring 93 is moved toward the lower end of the governor spring 93.

In the brush cutter 310 of the embodiment, the throttle wire 100 is also effectively used for realizing switching between the idling state and working state. That is, as shown in FIGS. 5A through 5D, the switching between the idling state and working state can be realized by manipulating the throttle wire 100 at the handle 13 while the position of the upper end of the governor spring 93 is permitted to change.

As shown in FIG. 4, the throttle wire 100 is slidably movably provided inside an outer tube 101. The outer tube 101 is fixed, by a mounting nut 103, to a throttle wire mounting portion 102 fixed to the carburetor 70. The throttle wire 100 is exposed from the outer tube 101 above the throttle wire mounting portion 102. The throttle wire 100 exposed from the outer tube 101 has an upper end (one end) to which an arm abutting portion 104 is attached. The arm abutting portion 104 is configured to abut on a right end portion of the arm 94 from below and is an example of an abutting portion. Further, a throttle return spring 105 is disposed between the arm abutting portion 104 and throttle wire mounting portion 102 such that the throttle wire 100 exposed from the outer tube 101 is wound around by the throttle return spring 105. The arm abutting portion 104 and throttle wire 100 connected thereto are thus normally biased upward due to expansion (biasing force) of the throttle return spring 105, thereby biasing the arm abutting portion 104 toward the arm 94.

That is, in FIG. 4, the left end portion of the arm 94 (throttle valve shaft 71) is biased clockwise by the governor spring 93, while the right end portion of the arm 94 is biased counterclockwise by the throttle return spring 105. That is, the left and right end portions of the arm 94 are biased respectively in two opposite directions.

It should be noted that the torque applied to the arm 94 from the throttle return spring 105 is set to be larger than the torque applied to the arm 94 from the governor spring 93. Hence, as long as the throttle return spring 105 expands, the arm abutting portion 104 abuts on the right end portion of the arm 94 from below irrespective of the state of the governor spring 93. The throttle valve shaft 71 is thus biased in the counterclockwise direction in FIG. 4 (clockwise direction in FIG. 2). In other words, while the throttle wire 100 is not operated, the throttle opening is rendered small (reduced). This is the idling state.

When the operator grips the throttle lever 17, the throttle wire 100 is pulled downward in FIG. 4 against the biasing force of the throttle return spring 105. FIGS. 5A to 5D illustrate movements of the throttle valve shaft 71 and its peripheral components before and after the operator's gripping of the throttle lever 17.

Figure 5A:
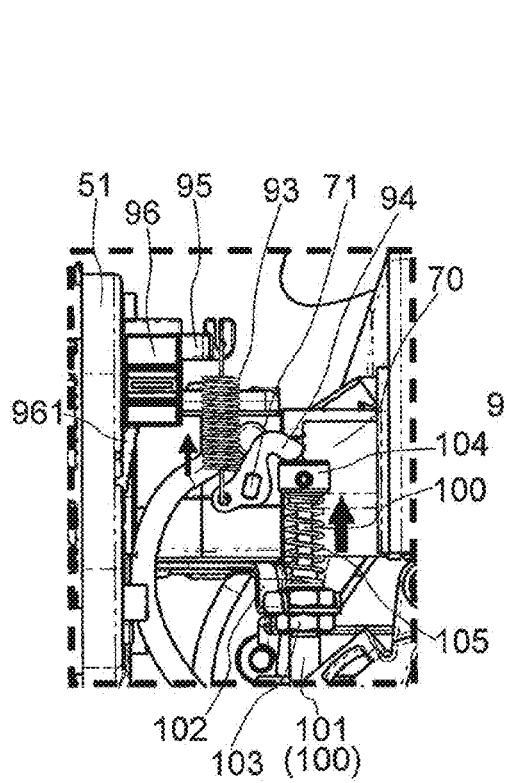
FIGS. 5A-5D are views explaining operations of a governor spring and surrounding components according to the embodiment as viewed from the rear side thereof.
Figure 5B:
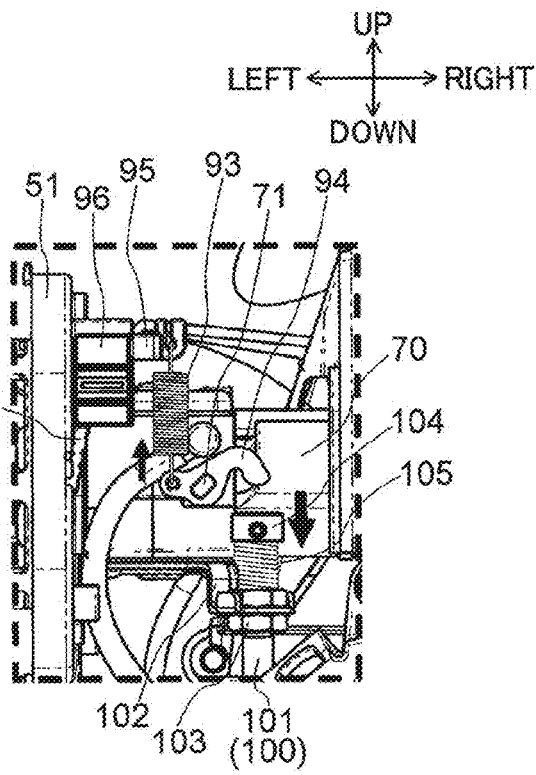

FIG. 5A illustrates the idling state. If the throttle wire 100 is pulled downward in this state, the arm abutting portion 104 is moved downward to be separated from the arm 94, as shown in FIG. 5B. At this time, the arm 94 (throttle valve shaft 71) is biased by the governor spring 93 in the clockwise direction in FIGS. 4 to 5B (in the direction to increase the throttle opening). As a result, the rotation speed of the engine 40 increases to bring the engine 40 into its working state. Thereafter, operations by the wind governor 90 illustrated in FIGS. 3A to 3C are performed as long as the arm 94 is separated from the arm abutting portion 104 that has moved downward. That is, the throttle opening of the throttle valve shaft 71 is configured to be determined to obtain a balance between the pressure of the cooling air applied to the governor plate 91 and the biasing force of the governor spring 93. The rotation speed of the engine 40 is automatically set in accordance with the throttle opening (angular rotation) of the throttle valve shaft 71.

In order to change the position of the upper end of the governor spring 93, the vertical position of the governor spring mounting portion 95 is changed relative to the air cleaner box 51. As shown in FIG. 6, the governor spring mounting portion 95 has a left end portion that is fixed to a slide portion 96 of the air cleaner box 51. The slide portion 96 is provided on a right end surface of the air cleaner box 51 such that the slide portion 96 is slidable in the vertical direction along the right end surface of the air cleaner box 51. The slide portion 96 has a lower end portion to which an engaging part 961 is fixed. The engaging part 961 has a resiliency and has a lower end portion that is biased to the left. An engaging projection 962 is also provided on the lower end portion of the engaging part 961. The engaging projection 962 protrudes leftward from the lower end portion of the engaging part 961 and extends in the front-rear direction (in a direction orthogonal to the sheet of FIG. 6). Further, on the right end surface of the air cleaner box 51, two engagement grooves 511 and 512 are formed below the slide portion 96. The engagement grooves 511 and 512 are arranged to be aligned with each other in the vertical direction and extend parallel to each other in the front-rear direction. The engaging projection 962 can be engaged with one of the engagement grooves 511 and 512. Thus the vertical position of the slide portion 96 is determined based on which of the engagement grooves 511 and 512 the engaging projection 962 is engaged with. That is, with this configuration, the vertical position of the governor spring mounting portion 95 (fixed to the slide portion 96) can be selectively determined to one of two positions corresponding to the engagement grooves 511 and 512: a higher position or a lower position. In the example of FIG. 6, the engaging projection 962 is engaged with the engagement groove 512 lower than the engagement groove 511, and the governor spring mounting portion 95 is fixed at its lower position.

Figure 5C:
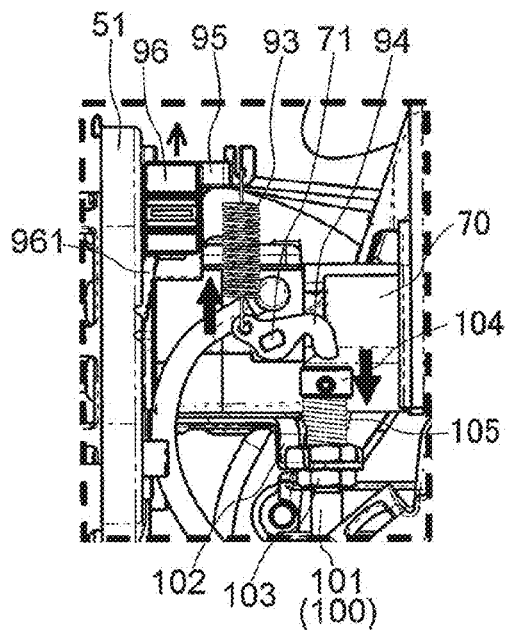

In FIG. 5B, the governor spring mounting portion 95 is fixed at its lower position corresponding to the engagement groove 512. FIG. 5C illustrates the governor spring mounting portion 95 fixed at its higher position corresponding to the engagement groove 511. When the governor spring mounting portion 95 is moved to the higher position (FIG. 5C) from the lower position (FIG. 5B), the biasing force of the governor spring 93 increases since the governor spring 93 is pulled further upward in FIG. 5C than in FIG. 5B. As a result of increase in the biasing force of the governor spring 93, the arm 94 is pivotally moved clockwise to cause the throttle valve shaft 71 to angularly rotate in the clockwise direction in FIG. 5C, thereby increasing the rotation speed of the engine 40. With the throttle valve shaft 71 (arm 94) maintained at the orientation shown in FIG. 5C (at the newly-set increased rotation speed of the engine 40), the wind governor 90 then performs controls (shown in FIGS. 3A-3C) to maintain the increased rotation speed of the engine 40 substantially constant.

In this way, in the engine 40 of the present embodiment, the rotation speed of the engine 40 in the working state is switchable between a low speed (FIG. 5B) and a high speed (FIG. 5C). This switch in the rotation speed is realized simply by changing the vertical position (mounting position) of the governor spring mounting portion 95 relative to the air cleaner box 51. Switching between high and low speeds at the engine 40 can thus be easily performed even in the working state (even during rotation of the cutting blade 11).

Figure 5D:
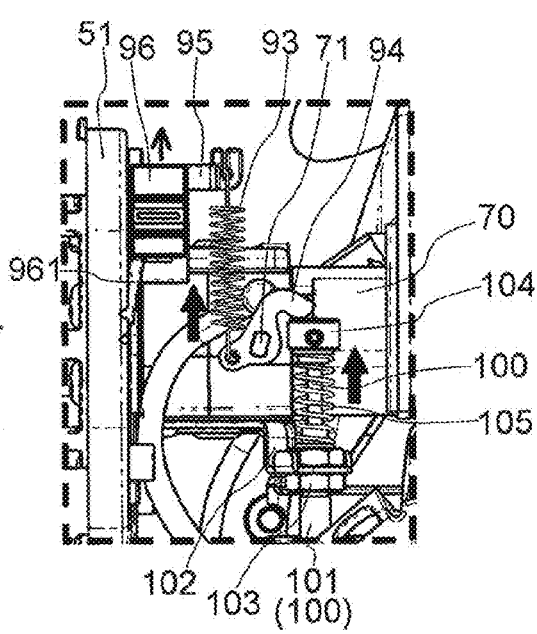

FIG. 5D illustrates a state where the operator releases the throttle lever 17 from the state shown in FIG. 5C and the throttle wire 100 has moved upward again due to the biasing force (expansion) of the throttle return spring 105. In this state shown in FIG. 5D, the entire length of the governor spring 93 is longer than that in FIG. 5A since the upper end of the governor spring 93 has been moved higher than that in FIG. 5A (the governor spring mounting portion 95 is at its higher position). The biasing force of the governor spring 93 is therefore stronger (larger) in FIG. 5D than in FIG. 5A.

Incidentally, the orientation of the arm 94 (throttle opening of the throttle valve shaft 71) in FIG. 5D can also be set similarly to that in FIG. 5A, provided that the torque applied to the arm 94 from the throttle return spring 105 is larger than the torque applied to the arm 94 from the governor spring 93. Thus the engine 40 can be brought into the idling state even if the governor spring mounting portion 95 is at the higher position as shown in FIG. 5D. In other words, operator's releasing his or her hand from the throttle lever 17 allows the engine 40 to be brought back to the idling state, irrespective of the vertical position of the upper end of the governor spring 93 (or regardless of the position of the governor spring mounting portion 95 relative to the air cleaner box 51).

What is most significant in the configuration of the present embodiment is that the governor spring mounting portion 95 can be attached to the air cleaner box 51 (or to the carburetor 70) selectively at different positions, while the connection between the throttle valve shaft 71 and other components (such as the governor plate 91 and throttle wire 100) is realized in the same manner as in a conventional engine-powered work tool. With the simple-structured governor spring mounting portion 95, adjustment of the rotation speed of the engine 40 (cutting blade 11) in the working state can be realized easily in the brush cutter 310 of the present embodiment.

As a variation, the governor spring mounting portion 95 itself may be designed as a selector switch configured to be slidably mounted on the air cleaner box 51 in the vertical direction. This configuration can also obtain easy switching of the vertical position of the governor spring mounting portion 95 (upper end of the governor spring 93).

In the examples of FIGS. 4 through 6, two kinds of positions are provided for the governor spring mounting portion 95 to be attached to the air cleaner box 51. However, three or more than three positions may be available for attachment of the governor spring mounting portion 95 to the air cleaner box 51 by increasing the number of the engagement grooves formed on the air cleaner box 51. With this structure, three or more than three levels of rotation speed can be provided for the engine 40 in the working state.

Figure 7:
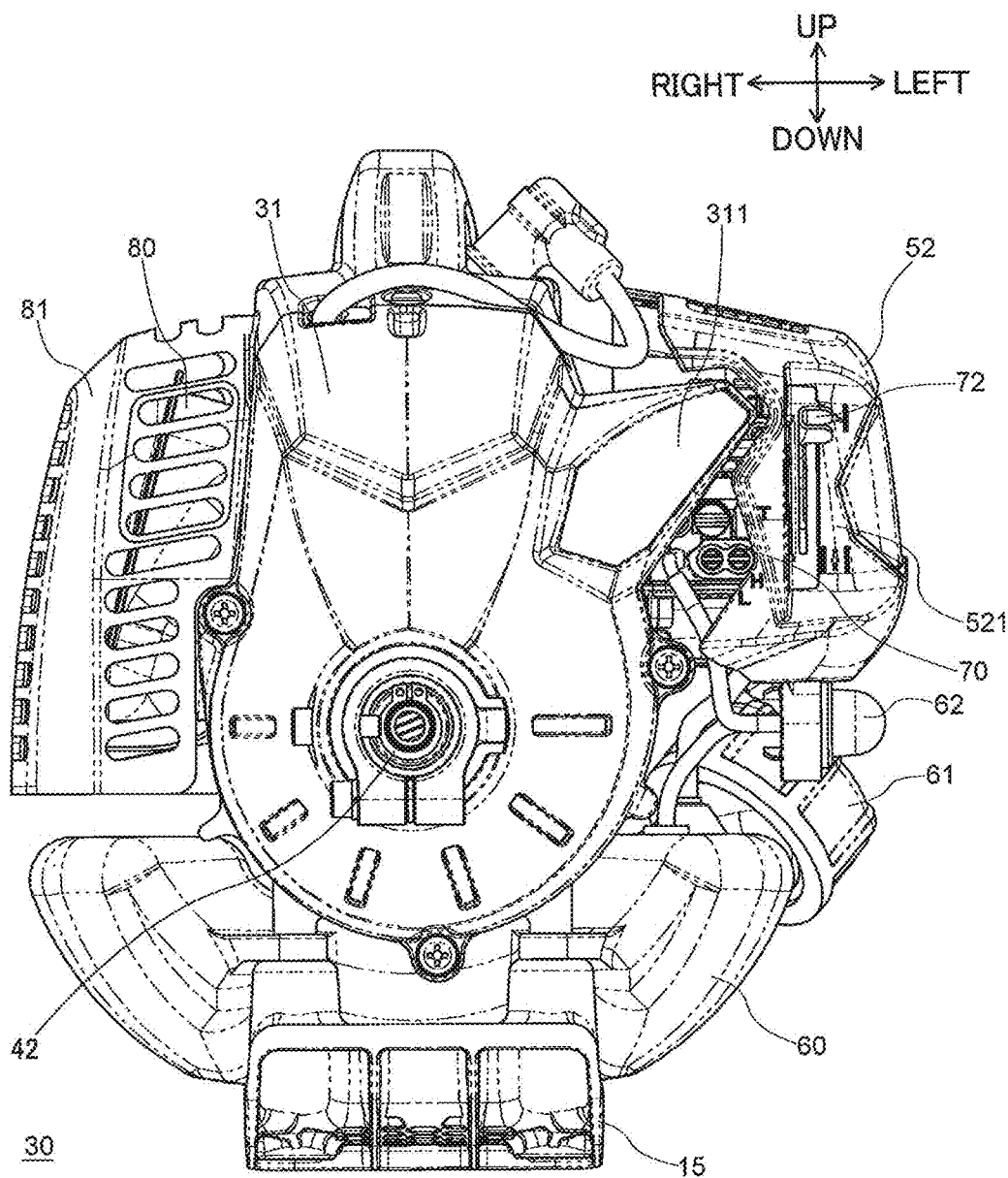
FIG. 7 is a front view of the drive section covered by the fan case according to the embodiment.
Figure 8:
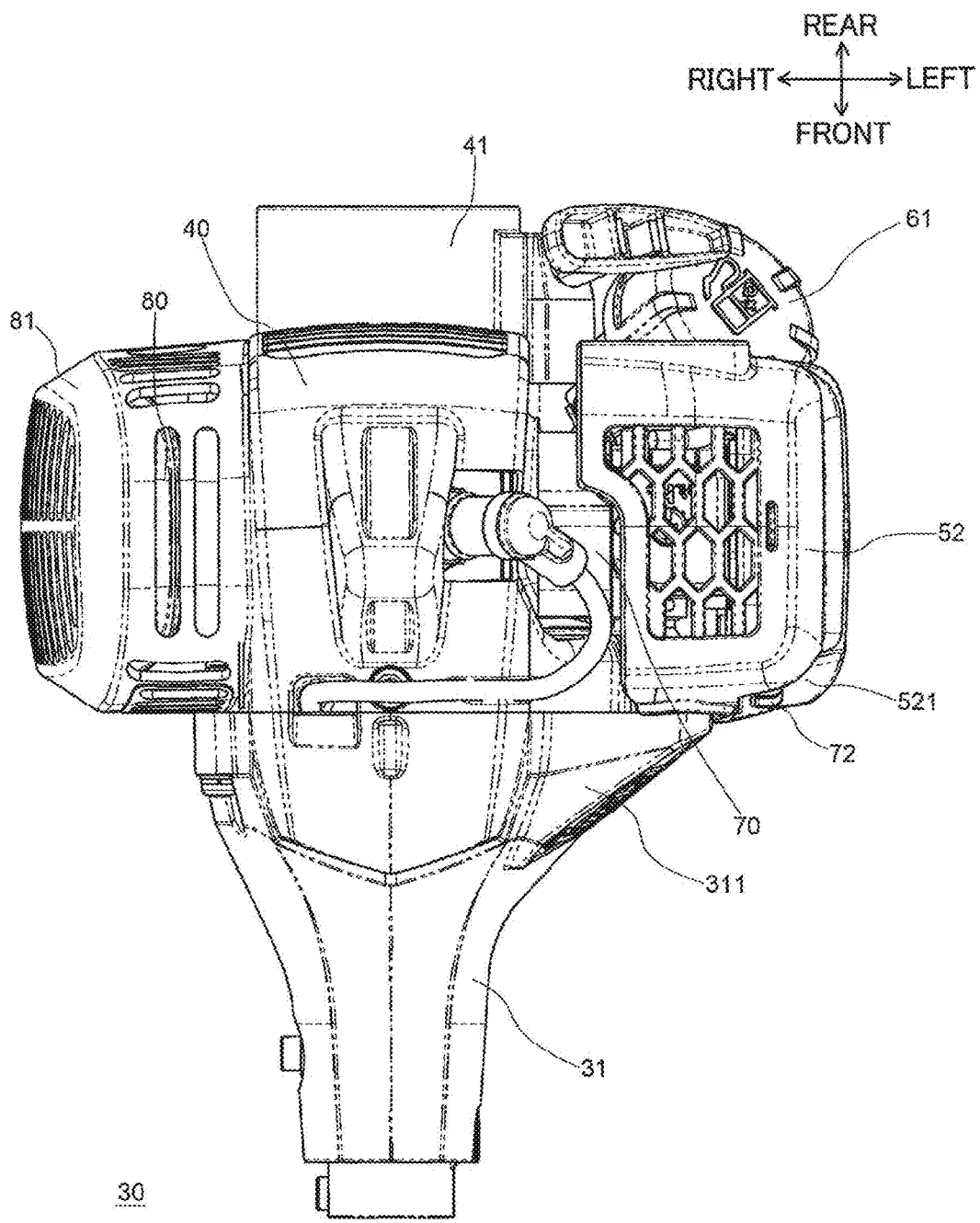
FIG. 8 is a top view of the drive section covered by the fan case according to the embodiment.

FIG. 7 is a front view of the drive section 30 covered by the fan case 31, and FIG. 8 is a top view of the drive section 30 covered by the fan case 31.

As shown in FIG. 1B, the fan case 31 covers the front portion of the drive section 30. The fan case 31 has a shape to allow the cooling air to flow smoothly so that the cooling air is configured to flow inside the fan case 31 to effectively cool the engine 40. At this time, the cooling air is configured to act on the wind governor 90. Components near the wind governor 90 are covered with the air cleaner cover 52 for protection of the same.

As described earlier, the operator holds the handles 13 (grips 16) to operate the brush cutter 310 with his or her waist abutting against the waist pad portion 21. Components of the drive section 30 are therefore positioned close to the operator while the operator holds the brush cutter 310. Since the carburetor 70 and muffler 80 are respectively provided on the left and right sides of the engine 40, one of the carburetor 70 and muffler 80 may come close to the operator when the operator operates the brush cutter 310. Here, preferably, the muffler 80 should not be brought closer to the operator since the muffler 80 is configured to release exhaust gas therefrom and becomes hot in temperature. For this reason, the carburetor 70 is designed to come close to the operator, more specifically, to be positioned on the left side of the engine 40. That is, the operator performs operations while holding the brush cutter 310 on his or her right side. Accordingly, during operations, the air cleaner cover 52 covering the air cleaner 50 is in abutment with the operator.

As shown in FIGS. 2, 7 and 8, the carburetor 70 is provided to the left of the engine 40, and the air cleaner 50 is provided to the left of the carburetor 70. That is, the carburetor 70 is disposed between the air cleaner 50 and engine 40. The air cleaner 50 is larger in size than the carburetor 70. Thus, without the fan case 31 and air cleaner cover 52, there exists a large difference in external dimension in the left end portion of the drive section 30 (the drive section 30 has an outer shape with steps or gaps formed in the portion contacting the operator during operations). In order to avoid such stepped structure from contacting the operator during operations and to ease operator's discomfort at the time of holding the brush cutter 310, the fan case 31 and air cleaner cover 52 are each designed to have a smooth surface on the portion abutting against the operator.

Incidentally, the operator may sometimes need to adjust the carburetor 70 using a tool such as a driver. Preferably such adjustment can be performed without removing the air cleaner cover 52. Further, as in conventional carburetors, a choke mechanism is provided in the carburetor 70 for starting the engine 40 during the cold season. The choke mechanism includes a choke lever 72 for operator's operation. The operator pulls the choke lever 72 to close a choke valve (not shown), thereby forming an air-fuel mixture with a higher fuel ratio than in a normal operation state. The choke mechanism functions to temporarily supply such rich air-fuel mixture to the engine 40 upon stating the engine 40 to enhance starting performance of the engine 40. The choke lever 72 provided in the carburetor 70 is shown in FIGS. 7 and 8, but omitted in FIGS. 1 to 6.

On the surface of the air cleaner cover 52, a concave portion 521 is formed, as shown in FIG. 7. The concave portion 521 is in a form of a recess elongated in the vertical direction. The concave portion 521 is configured to receive the leading end of the choke lever 72 therein such that the leading end of the choke lever 72 is movable in the vertical direction along the concave portion 521. This allows the operator's access to the choke lever 72 without removing the air cleaner cover 52.

The choke lever 72 may be configured to pivotally move or may have a leading end capable of moving with large strokes. Preferably, such operations of the choke lever 72 are also performed without removing the air cleaner cover 52.

In order for such adjustment of the carburetor 70 and manipulations on the choke lever 72 to be carried out without removing the air cleaner cover 52, the fan case 31 is provided with a carburetor cover portion 311. Specifically, as illustrated in FIG. 7, the carburetor cover portion 311 extends generally diagonally upward and leftward from a portion of the fan case 31 covering the crank shaft 42. The carburetor 70 is partially exposed below the carburetor cover portion 311. As illustrated in FIG. 8, the carburetor cover portion 311 extends toward the air cleaner cover 52 and is formed with a smooth surface around a boundary between the carburetor cover portion 311 and air cleaner cover 52. In general, the operator performs operations with the brush cutter 310 held below his or her right underarm. Therefore, the operator can be brought into contact with the smooth surface of the carburetor cover portion 311 provided at the upper-left portion of the drive section 30 (upper-right in FIG. 7). Further, electrical wirings can also be disposed inside the carburetor cover portion 311 and covered by the same. Thus, damages to the electrical wiring can be prevented since the operator cannot touch these wirings. Further, adjustment to the exposed part of the carburetor 70 can be made without removing the air cleaner cover 52 since the carburetor 70 is partially exposed below the carburetor cover portion 311.

Alternatively, the choke lever 72 may be arranged to be positioned below the carburetor cover portion 311, for example. However, practically, such arrangement makes manipulation of the choke lever 72 difficult since the choke lever 72 is required to move with a large stroke.

In contrast, in case of the present invention, the operator can operate the choke lever 72 at a position away from the carburetor cover portion 311 that can contact the operator's waist. The operator's manipulation to the choke lever 72 can be therefore facilitated. Further, the leading end of the choke lever 72 is received in the concave portion 521 in the present embodiment. This structure can suppress the operator's accidental contact onto the choke lever 72 and resultant unintended operations to the choke lever 72. Still further, the vertically elongated shape of the concave portion 521 enables the choke lever 72 to move with larger strokes. The operator's contact with the air cleaner cover 52 (in which the concave portion 521 is formed) does not hinder operator's holding of the brush cutter 310, thereby preventing the operator from feeling discomfort in holding the brush cutter 310.

Various modifications and variations are conceivable.

Now, a drive section 130 according to a modification to the present embodiment will be described with reference to FIGS. 9 through 11, wherein like parts and components are designated by the same reference numerals with those of the depicted embodiment in order to avoid duplicating description. Also note that in FIG. 9, the air cleaner 50, air cleaner box 51 and air cleaner cover 52 are omitted for facilitating explanation.

In the embodiment describe above, adjustment of the biasing force of the governor spring 93 can be performed on the air cleaner box 51, specifically by changing the vertical position (mounting position) of the governor spring mounting portion 95 relative to the air cleaner box 51.

In the drive section 130 of the modification, adjustment of a biasing force of a governor spring 193 is performed not on the air cleaner box 51, but at the handle 13 through a governor spring adjustment wire 110. In other words, in the drive section 130 of the modification, the governor spring adjustment wire 110 and the throttle wire 100 are both provided and used in combination.

Although the throttle wire 100 and the arm abutting portion 104 have the same structure as in the embodiment, the upper end of the outer tube 101 is now fixed, by the mounting nut 103, to a throttle wire mounting portion 202 fixed to the carburetor 70. The throttle wire mounting portion 202 has a left-light dimension larger than that of throttle wire mounting portion 102 of the depicted embodiment. On this throttle wire mounting portion 202, the governor spring adjustment wire 110 is arranged to extend generally in parallel to the throttle wire 100.

Specifically, the governor spring adjustment wire 110 is slidably movably provided within an outer tube 111. The outer tube 111 has an upper end fixed to the throttle wire mounting portion 202, by a mounting nut 112, at a position leftward of the outer tube 101. The governor spring adjustment wire 110 is exposed from the outer tube 111 above the throttle wire mounting portion 202. A governor spring mounting portion 195 is fixed to an exposed upper end (one end) of the governor spring adjustment wire 110. This governor spring mounting portion 195 is engaged with a lower end of the governor spring 193.

Figure 9:
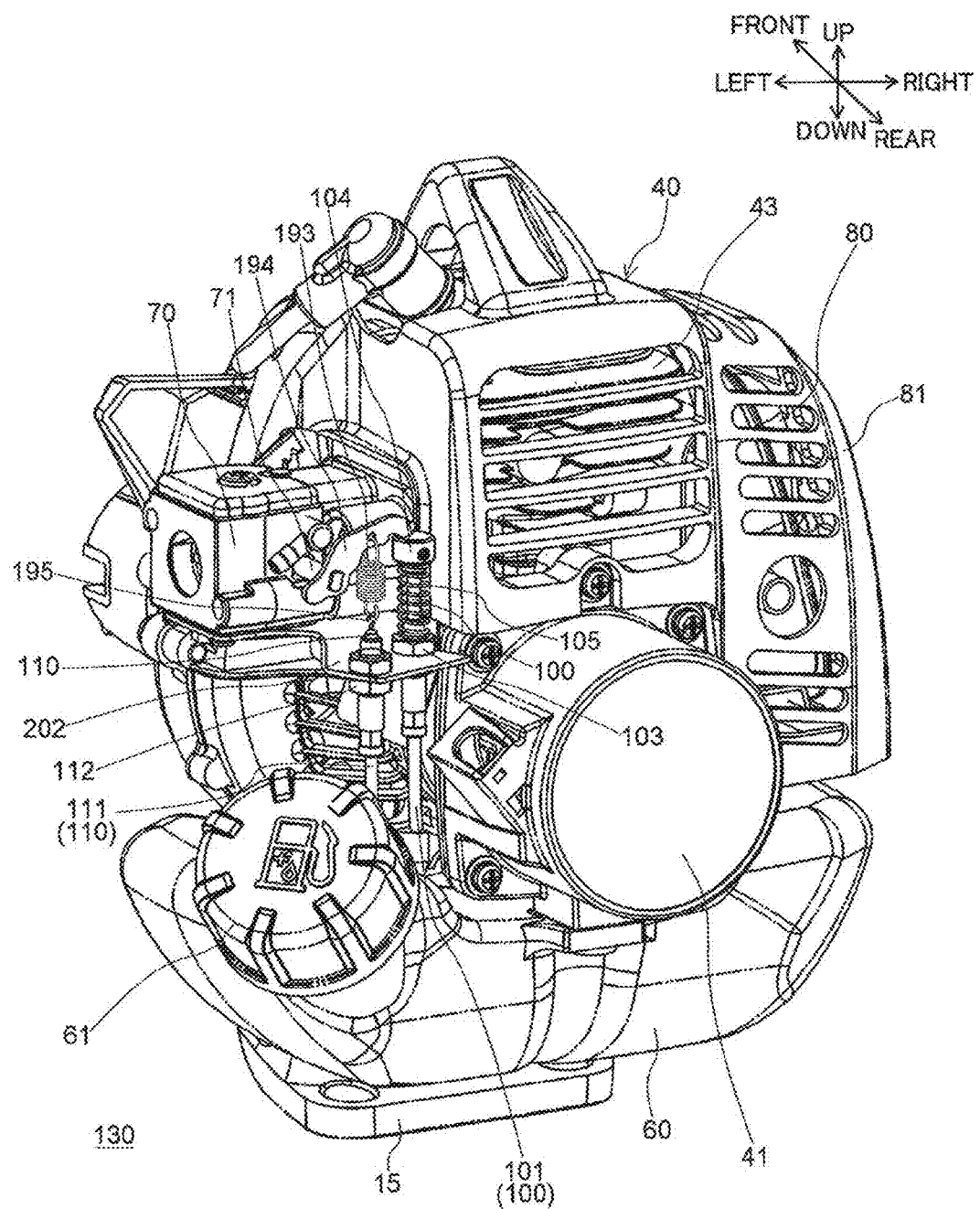
FIG. 9 is a perspective rear-side view of a drive section of a brush cutter according to a modification to the embodiment of the present invention.
Figure 10:
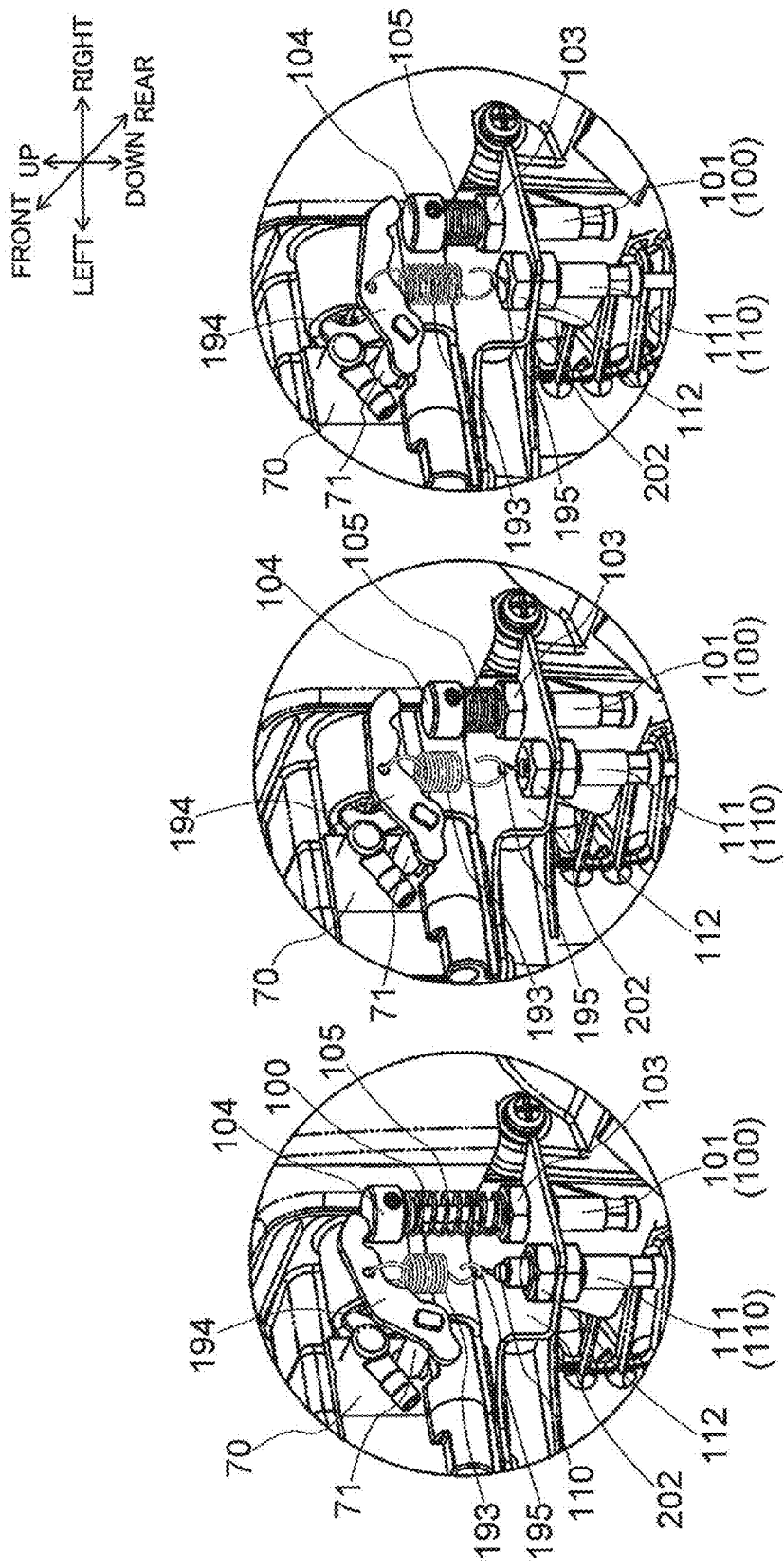
FIGS. 10A-10C are views explaining operations of a governor spring and surrounding components according to the modification as viewed from the rear side thereof.

As shown in FIG. 9, an arm 194 is fixed to the rear end portion of the throttle valve shaft 71. The arm 194 has a right end portion extending rightward from the throttle valve shaft 71, and the governor spring 193 (upper end thereof) is engaged with the right end portion from below. That is, the governor spring 193 is positioned to the right of the throttle valve shaft 71 in the arm 194. The arm abutting portion 104 fixed to the upper end of the throttle wire 100 is configured to abut on the right end portion of the arm 194 from below, as in the embodiment. In other words, the governor spring 193 and arm abutting portion 104 are both positioned on the same side (right side) with respect to the throttle valve shaft 71. Thus, in the arm 194, only its right end portion is applied with the biasing force from the arm abutting portion 104 and/or from the governor spring 193.

In this way, the upper end of the governor spring 193 is engaged with the right end portion of the arm 194, while the lower end of the governor spring 193 is connected to the governor spring adjustment wire 110 via the governor spring mounting portion 195. With this configuration, the throttle valve shaft 71 is biased by the biasing force of the governor spring 193 in the direction to increase the rotation speed of the engine 40 (i.e., in the clockwise direction in FIG. 9).

Pulling the governor spring adjustment wire 110 downward allows the governor spring mounting portion 195 to be moved downward concurrently, thereby increasing the biasing force of the governor spring 193 (see FIG. 10C). That is, the rotation speed of the engine 40 in the working state can be increased. To the contrary, moving the governor spring adjustment wire 110 upward from this state (see FIG. 10B) causes the governor spring mounting portion 195 to be also moved upward, thereby reducing the biasing force of the governor spring 193. In this way, the use of the governor spring adjustment wire 110 allows adjustment of the rotation speed of the engine 40 in the working state.

FIGS. 10A to 10C illustrate states in the vicinity of the throttle valve shaft 71 based on the operation modes of the engine 40. FIG. 10A illustrates a state where the throttle wire 100 is not pulled, while FIGS. 10B and 10C illustrate a state where the throttle wire 100 has been pulled. Further, the governor spring adjustment wire 110 is not pulled in FIGS. 10A and 10B, whereas the governor spring adjustment wire 110 has been pulled in FIG. 10C. FIG. 10A represents the idling state, FIG. 10B represents the working state at a low rotation speed, and FIG. 10C represents the working state at a high rotation speed. FIGS. 10A-10C respectively correspond to the states of FIGS. 5A-5C of the depicted embodiment.

As is the case with the throttle wire 100, operations to pull and move back the governor spring adjustment wire 110 can done at the right handle 13, far from the carburetor 70.

Figure 11:
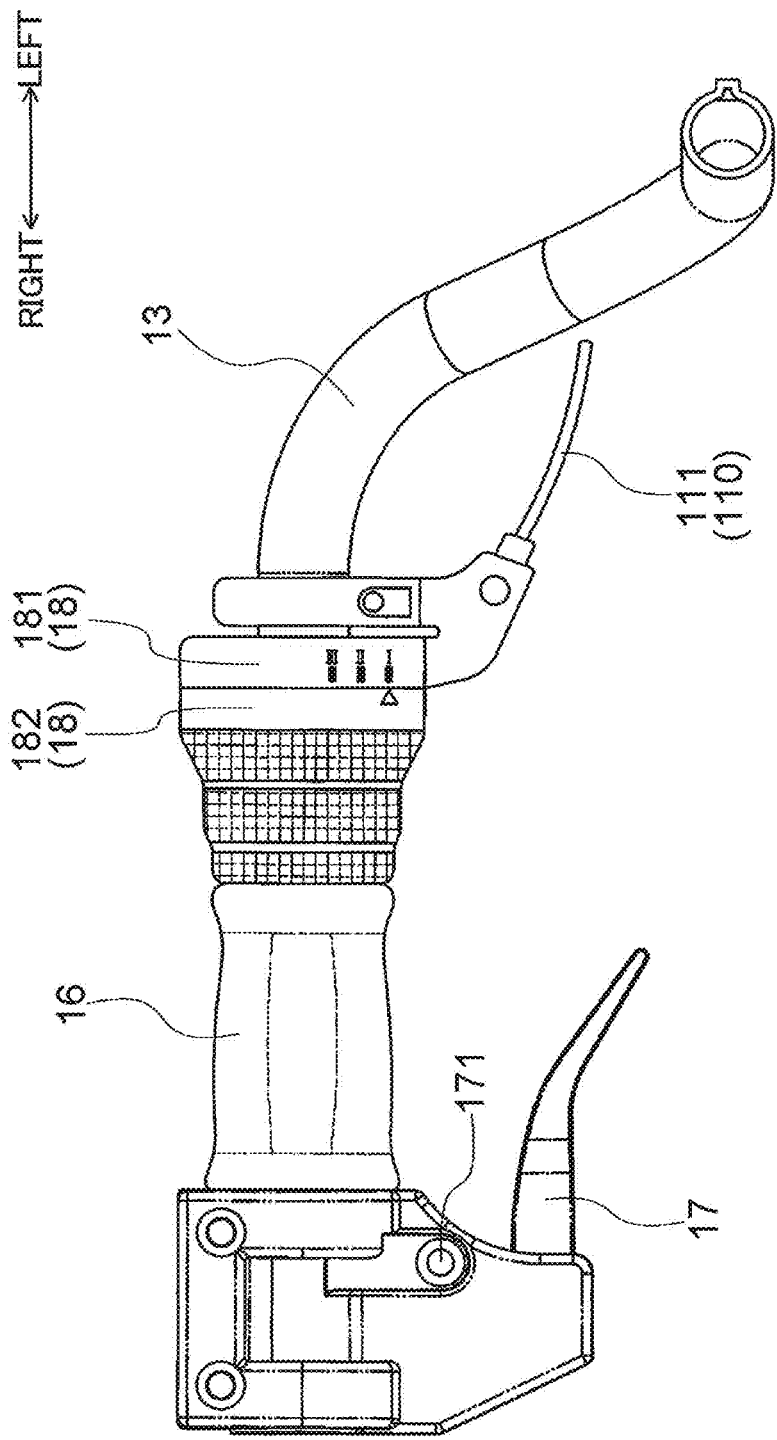
FIG. 11 is a side view illustrating a structure of a handle of the brush cutter according to the modification.

FIG. 11 shows an illustrative example of another end of the governor spring adjustment wire 110 provided on the right handle 13 shown in FIG. 1A. The throttle lever 17 is provided on a distal end portion (right end portion) of the grip 16 that is positioned on the distal end portion of the right handle 13. The throttle lever 17 is pivotally movable upward and downward about a throttle lever pivot 171 and is connected to the another end of the throttle wire 100. When the operator grips the throttle lever 17 to pivotally move its left end portion upward, the throttle wire 100 is pulled toward the handle 13, i.e., downward in FIG. 9 and in FIG. 10A-10C.

A speed adjustment mechanism (switching dial) 18 for adjusting the rotation speed of the cutting blade 11 is also provided on the right handle 13 at a position inward (on the right in FIG. 11) of the grip 16. The speed adjustment mechanism 18 includes a scale portion 181 and a switching portion 182. The scale portion 181 is fixedly mounted on the handle 13. The scale portion 181 is given three kinds of marks I, II and III aligned with one another in an outer circumferential direction of the handle 13. These marks I, II and III correspond to the three levels of the rotation speed of the cutting blade 11 available for the brush cutter 310 in this modification. The switching portion 182 is provided on the handle 13 so as to be rotatable relative to the handle 13 in a stepwise manner. The switching portion 182 is connected with the another end of the governor spring adjustment wire 110 within the right handle 13. The switching portion 182 has a triangular-shaped indicator shown thereon. The position of this indicator can be selectively set to one of the three marks I, II and III shown on the scale portion 181 in accordance with the operator's rotation of the switching portion 182. With this configuration, by how much the governor spring adjustment wire 110 is pulled can be determined in three kinds of levels based on by how much the switching portion 182 is rotated relative to the handle 13. This structure realizes the movement of the governor spring adjustment wire 110 (being pulled downward or moved upward) near the carburetor 70 as illustrated in FIG. 10A-10C.

The operator holds the grips 16 of the handles 13 and rotates the switching portion 182 to adjust the rotation speed of the cutting blade 11, while operating the throttle lever 17.

Generally, the adjustment of the rotation speed of the cutting blade 11 (operation of the switching portion 182) is assumed to be performed less frequently than the operation of the throttle lever 17. Hence, the arrangement on the handle 13 of this modification (the speed adjustment mechanism 18 is arranged inward of the grip 16 and away from the throttle lever 17) should be user-friendly.

Incidentally, while a plurality of (two) mounting positions is provided for the governor spring mounting portion 95 in the depicted embodiment, the dial-type speed adjustment mechanism 18 of this modification can provide more varieties in position of the governor spring mounting portion 195 to realize increased levels in the rotation speed of the cutting blade 11 and easy switching of the rotation speed. Further, provision of the scale portion 181 having the three kinds of marks shown thereon can allow the operator to perform switching of the switching portion 182 more reliably.

In the embodiment and modification, the throttle valve shaft 71 extends in the front-rear direction to penetrate a main body of the carburetor 70 therethrough, and the governor plate 91 and governor rod 92 are fixed to the front end (one end) of the throttle valve shaft 71, while the arm 94, 194 and governor spring 93, 193 are fixed to the rear end (another end) of the throttle valve shaft 71. However, all these components (governor plate 91, governor rod 92, arm 94 or 194, and governor spring 93 or 193) may be provided on the same end of the throttle valve shaft 71. In this case, the throttle valve shaft 71 does not necessarily penetrate the main body of the carburetor 70. However, the depicted configurations are particularly preferable to realize a simplified structure near the carburetor 70 and to ensure smooth operations.

Further, structures other than those described above are available to obtain the same technical effects, provided that the another end of the governor spring (upper end of the governor spring 93, or lower end of the governor spring 193) is allowed to change in position. Further, other configurations are also available for the engine as a whole and the output controller used therefor, as long as the wind governor can perform the above-described operations to control the rotation speed of the engine.

In the depicted examples, the brush cutter is used as an example of the engine-powered work tool of the present invention. However, the present invention can also be applicable to other types of portable engine-powered work tools provided with air-cooled engines.

While the invention has been described in detail with reference to the above-described embodiments thereof, it would be apparent to those skilled in the art that various changes and modifications may be made therein without departing from the scope of the invention.

What is claimed is:

1. An engine-powered work tool comprising:
   an air-cooled engine including a crank shaft configured to rotate and a cooling fan fixed to the crank shaft and configured to rotate together with the crank shaft to generate cooling air;
   an output controller configured to control a rotation speed of the crank shaft, the output controller including an output control shaft defining an axis and configured to make an angular rotation about the axis, the rotation speed of the crank shaft being controlled based on the angular rotation of the output control shaft; and
   a wind governor configured to control the angular rotation of the output control shaft, the wind governor comprising:
   a governor plate configured to receive the cooling air to apply a force to the output control shaft such that the rotation speed of the crank shaft decreases;
   an arm fixed to the output control shaft; and
   a governor spring configured to apply a biasing force to the output control shaft through the arm such that the rotation speed of the crank shaft increases, the governor spring having one end connected to the arm and another end changeable in position relative to the output controller among a plurality of prescribed positions, the position of the another end of the governor spring being switchable from one to another among the plurality of prescribed positions.

2. The engine-powered work tool as claimed in claim 1, wherein the output controller includes a main body through which the output control shaft penetrates, the output control shaft having one end and another end opposite to each other; and
   wherein the governor plate is fixed to the one end of the output control shaft and the governor spring is fixed to the another end of the output control shaft.

3. The engine-powered work tool as claimed in claim 1, further comprising:
   an air cleaner configured to introduce air into the output controller;
   an air cleaner box attached to the output controller for covering the air cleaner; and
   a mounting portion selectively attachable to the air clear box at one of a plurality of mounting positions corresponding to the plurality of prescribed positions, the another end of the governor spring being engaged with the mounting portion such that the position of the another end of the governor spring relative to the air cleaner box can be changed from one to another among the plurality of prescribed positions.

4. The engine-powered work tool as claimed in claim 3, further comprising:
   a handle to be gripped by an operator; and
   a throttle wire having one end provided with an abutting portion configured to abut on the arm and another end connected to the handle, the abutment of the abutting portion with the arm causing the output control shaft to be biased in a direction to decrease the rotation speed of the crank shaft.

5. The engine-powered work tool as claimed in claim 4, wherein the handle is provided with a throttle lever connected to the another end of the throttle wire, the operator's operation of the throttle lever at the handle enabling the abutting portion to abut on and separate from the arm.

6. The engine-powered work tool as claimed in claim 1, further comprising:
   a handle to be gripped by an operator; and
   an adjustment wire having one end connected to the another end of the governor spring and another end provided at the handle, the position of the another end of the governor spring relative to the output controller being switchable from one to another among the plurality of prescribed positions in accordance with operations by the operator at the handle through the adjustment wire.

7. The engine-powered work tool as claimed in claim 6, wherein the handle is provided with a switching dial connected to the another end of the adjustment wire, the operator's operations of the switching dial at the handle enabling the position of the another end of the governor spring to be switched from one to another among the plurality of prescribed positions.

8. The engine-powered work tool as claimed in claim 6, further comprising a throttle wire having one end provided with an abutting portion configured to abut on the arm and another end connected to the handle, the abutment of the abutting portion with the arm causing the output control shaft to be biased in a direction to decrease the rotation speed of the crank shaft.

9. The engine-powered work tool as claimed in claim 8, wherein the handle is provided with a throttle lever connected to the another end of the throttle wire, the operator's operation of the throttle lever at the handle enabling the abutting portion to abut on and separate from the arm.

10. The engine-powered work tool as claimed in claim 1, further comprising:
- a cutting blade configured to rotate in accordance with the rotation of the crank shaft; and
- a supporting shaft having one end provided with the cutting blade and another end provided with the air-cooled engine, the output controller and the wind governor to constitute a brush cutter.

* * * * *